United States Patent [19]

Herb et al.

[11] 4,023,788
[45] May 17, 1977

[54] DEVICE FOR AUTOMATICALLY SHIFTING A WORKPIECE ON A NIBBLING MACHINE

[75] Inventors: Eugen Herb, Ditzingen; Theodor Petera, Stuttgart, both of Germany

[73] Assignee: Trumpf Maschinen AG, Switzerland

[22] Filed: June 28, 1976

[21] Appl. No.: 700,339

[30] Foreign Application Priority Data

July 5, 1975 Germany .................... 2530056

[52] U.S. Cl. ........................... 269/73; 83/209; 83/237; 83/414; 83/916
[51] Int. Cl.² .................................. B26D 5/20
[58] Field of Search ............... 269/71, 73; 214/1 F, 214/1 BB; 83/209, 237, 916, 367, 410, 414

[56] References Cited

UNITED STATES PATENTS

| 3,563,123 | 8/1968 | Leibinger | 83/237 |
| 3,762,257 | 10/1973 | Mathews | 83/367 |
| 3,958,479 | 5/1976 | Leibinger | 83/209 |

Primary Examiner—Al Lawrence Smith
Assistant Examiner—Robert C. Watson
Attorney, Agent, or Firm—McGlew and Tuttle

[57] ABSTRACT

A device for shifting a workpiece on a nibbling machine which includes a rotary eccentric shaft which is rotatable to move a nibbling punch into and out of association with a workpiece, comprises a workpiece holder which is driven by a first motor in one direction, and a second motor in a direction transverse to this direction. A switch control is connected to each motor and includes means for imparting a programmed control of the operation of the motors which is varied in accordance with a sensing of the thickness of the workpiece being operated upon so that the movement may be accomplished when the nibbling punch is not in contact with the workpiece. The apparatus includes a control switch in the form of a switch lug which is mounted for rotation with the eccentric shaft of the nibbling punch and which cooperates with a contactless switch member to cause a turning on and off thereof. The control switch lug is advantageously contoured so that it defines an inner switch control surface which defines a control arc of operation which is greater than an outer surface, and means are provided for shifting the responsive switch so that it cooperates selectively with either the inner or outer surface or an intermediate surface in accordance with the thickness of the plate being formed.

10 Claims, 6 Drawing Figures

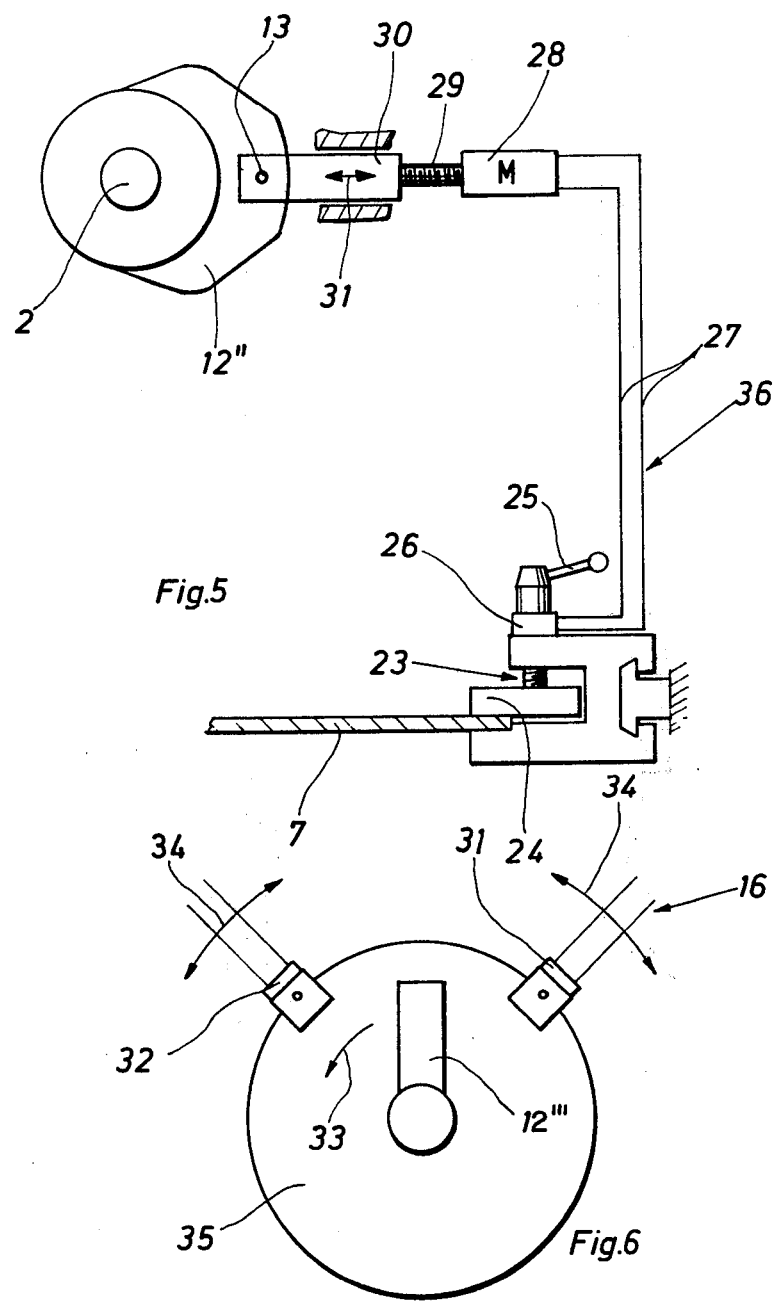

DEVICE FOR AUTOMATICALLY SHIFTING A WORKPIECE ON A NIBBLING MACHINE

FIELD AND BACKGROUND OF THE INVENTION

This invention relates in general to the construction of devices for shifting workpieces on metal working machines and, in particular, to a new and useful device for selectively shifting a workpiece in longitudinal and transverse directions, which includes means for varying the time at which the shifting motion is carried out in dependence upon the thickness of the workpiece being operated upon.

DESCRIPTION OF THE PRIOR ART

Many devices for shifting workpieces in respect to a workpiece are known. In addition, there are devices which are known for varying the workpiece feed as a function of the sheet metal thickness so that the machine may always operate at full capacity. In a first embodiment of such a device, a circular sector-shaped switch control member is provided which cooperates with a fixed switch member. Such a switch member comprises a contactless, solenoid-operated, switch. The switch control member itself is composed of two circular sector metal sheets which may be brought into various overlapping positions for varying the duration of the closed circuit position. With such an arrangement, first the thickness of the metal sheet or plate is determined and then, the effective length of the switch control member is adjusted by overlapping the two circular sector-shaped metal sheet pieces to the required degree corresponding to the thickness which is sensed. The mutual relation between the thickness of the workpiece and the effective length of the switch control member must be found out in a suitable manner and laid down, so that the operator can make the necessary adjustments on the switch control member.

In another known contruction, an iron lug cooperates with two contactless switches which are mounted within the range of motion of the lug and are spaced from each other in the direction of rotation and which form the switch members. The iron lug first travels past a starter switch and then, after a predetermined period of time, reaches a disconnecting switch. The starter switch closes the circuit for the motor or motors feeding the workpiece and the disconnecting switch interrupts the circuit again. Thereupon, in a suitable manner, the switches are reset into their initial position so that upon a new arrival of the switch lug at the starter switch, the cycle can recommence. In this variation of the prior art, the thickness of the metal sheet must be determined in advance in order to be able to vary or adjust the mutual spacing of the two stationary switches. Consequently, with both known constructions, certain operations are required which make the adjustment expensive, and it presupposes a corresponding attentiveness and knowledge by the operators. In particular, if only small variations in the thickness of metal sheets are involved, it may happen that the operator will tend to omit a new adjustment of the operational time.

SUMMARY OF THE INVENTION

In accordance with the present invention, there is provided a device for feeding a workpiece on a nibbling machine which includes a pivotal lever to ensure an optimal adjustment of the time during which the feed drive or drives for the workpiece are switched on. For this purpose, the device is provided with means for sensing the thickness of the plate which is to be operated upon and for shifting the relationship between a control member for the switching operation and a switch so that the time of switching is varied in direct dependence on the thickness of the metal sheet. With the arrangement, the thickness of the sheet is always monitored or measured and the thickness is transferred by an adjusting mechanism so as to position either a contactless switch and a control switch member in relation to each other so as to vary their time of operation or to adjust the spacing of the starter and disconnecting switches in relation to a control switch lug so that the operating time for the drive motors for moving the workpiece will be varied in dependence on the thickness of the workpiece.

The inventive device includes a sheet metal thickness meter or device for monitoring the thickness of the workpiece and for converting this measurement into a control or repositioning of the adjusting mechanism for operating the drive motors of the feed mechanism. The arrangement causes a variation of the duration of the closed circuit position of the cooperating switch controls for operating the motors, and a greater sheet thickness is associated with a shorter switch-on time and a smaller sheet thickness is associated with a longer switch-on time for the control motors. The duration of the switch-on time or the closed circuit position may be varied, for example, so that, assuming a constant speed of the switch control member, this switch control member is moved so as to influence the solenoid-operated switch for a longer or a shorter period of time.

While employing a switch control member designed as a sheet metal strip having a constant width and cooperating with a starter switch and a disconnecting switch, the duration of the closed circuit period can be varied by changing the mutual distance of the two switches, i.e., by moving at least one of the switches toward or away from the other by means of the adjusting mechanism.

In a preferred embodiment of the invention, a downholder or stripper is designed as a sheet metal thickness meter and is connected to the adjusting mechanism. In consequence, the motion of the downholder can be transmitted directly to the adjusting mechanism and, therefore, to the switch control member or the switch member. Accordingly, no particular device is needed for determining the thickness of the sheet. As a rule, the downholder is spaced from the sheet or workpiece by a small distance, for example, by 0.5 mm. Assuming that this distance is chosen equal for all sheet thicknesses, the distance of the downholder from the table supporting the workpiece always increases by an amount of the increased sheet thickness. The same is true for the reduced thickness of the sheet or workpiece. The adjusting motion of the downholder can be transmitted directly to the adjusting mechanism so that, if necessary, after a stepping up or reduction, an adjusting movement of the switch control member or the switch member is obtained which results in an always optimum adjustment of the switch-on time, in accordance with the thickness of the workpiece. The movement of the downholder may be effected mechanically, electrically, hydraulically or pneumatically, or by a combination of such drives.

In another advantage variation of the invention, a clamping mechanism for the metal sheet and, in particular, a clamping shoe, is designed as a sheet metal thickness meter and is connected to the adjusting mechanism. In contrast to a downholder, the clamping shoe rests directly against the workpiece or sheet. Therefore, the distance of its contact surface from the supporting surface of the workpiece table corresponds exactly to the sheet thickness, and for this reason, a clamping shoe or the like is perfectly suitable as a sheet metal thickness meter. The mode of operation is identical with or analagous to the operation of the downholder.

In a device which comprises a switch lug which is rotatable past a contactless switch, there is provided in accordance with a development of the invention, that the length of the switch lug in its circumferential direction will vary and, in particular, decrease, with an increase in the distance from the axis of rotation. The switch is then made displaceable approximately in the radial direction of the switching control member or lug. Thus, the adjusting mechanism acts on the switch member which is designed as a contactless switch so as to move the same in dependence upon the sheet thickness toward the axis of rotation of the switch control member or away from this axis, in accordance with the thickness of the workpiece. The switching lug is constructed so that its effective arcuate switching control surface, which is in association with the switch, will vary in accordance with whether the switch is further toward the axis of further away from the axis. With a thin metal sheet for the workpiece, the switch lug remains within the range of the switch during its arcuate movement for a longer period of time to cause the circuit of the feed mechanism to be closed for a longer period of time and to consequently cause the feed path of the workpiece to increase.

In another embodiment of the invention, a control lug for effecting the switching operation which cooperates with a contactless switch is constructed such that it includes an inner arcuate control area which extends a greater circumferential arcuate distance than an outer control area. Thus a switch held in position along the innermost control area of the control lug will be held in an operative position for a longer period of time than one held toward the outer control surface of the lug member. The adjustment mechanism therefore includes means for adjusting the control switch in respect to the control lug member so that it is shifted either radially inwardly or outwardly in respect to the control surfaces of the lug member in accordance with the length of time of operation of the drive motor which is desired as determined by the sheet thickness of the workpiece. The lug is advantageously formed so that there are variations in the length of arcuate control surface between the innermost control surface and the outermost control surface to accommodate for small variations of sheet thickness. Also, the lug member may be designed with stepped areas which define circumferential control tracks for the switch to provide stepped variations of switch operating time.

The radial displacement of the switch in respect to its control lug is accomplished by a mechanism which is operated by the position of the downholder so that the switch is automatically moved in accordance with the downholder position. The device advantageously includes a pivotal lever which has one leg with a portion sensing the position of a downholder over the workpiece and an opposite leg which is shifted by this positioning of the first leg to shift the switch in a desired direction along the control surfaces of the switching control lug. The swing axis of the lever is located so that it provides a very sensitive control for the shifting of the feed control in accordance with the workpiece thickness.

In another embodiment of the invention, a clamping mechanism employed for holding down the workpiece includes a rotatable handle portion which operates a potentiometer or servomotor circuit to cause a corresponding rotation of a servo control motor for shifting the switch in respect to a control lug. The construction is such that a definite position of the clamping member effects a definite position of the servomotor for controlling the location of the control switch. A rotary potentiometer may be employed as the clamping element for the clamp holding the workpiece and by varying the pickoff of the potentiometer by a bridge, for example, it may be adjusted with the result of a proportional adjusting movement of the servomotor to effect a precise control positioning of the control switch or switches.

Accordingly, it is an object of the invention to provide an improved device for shifting a workpiece on a nibbling machine which has a rotary eccentric shaft which is rotatable to move a nibbling punch into and out of association with the workpiece, and which includes a workpiece holder which is moved in transverse and longitudinal directions by separate drive motors which are controlled by a switch control means connected to the motors to turn them on and off, and by a sensor which is associated with the workpiece for sensing its thickness and which displaces the switch control in accordance with the sensed thickness for varying the operating times of the motors.

A further object of the invention is to provide a device for automatically sensing the thickness of a workpiece on a nibbling machine and for controlling the operation of the feed mechanism for a workpiece in accordance therewith, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

BRIEF DESCRIPTION OF THE DRAWINGS

In the Drawings:

FIGS. 4 to 6 are views similar to FIG. 2 of other embodiments of the invention.

DESCRIPTION OF THE PREFERRED EMBODIMENTS

Figure 1:
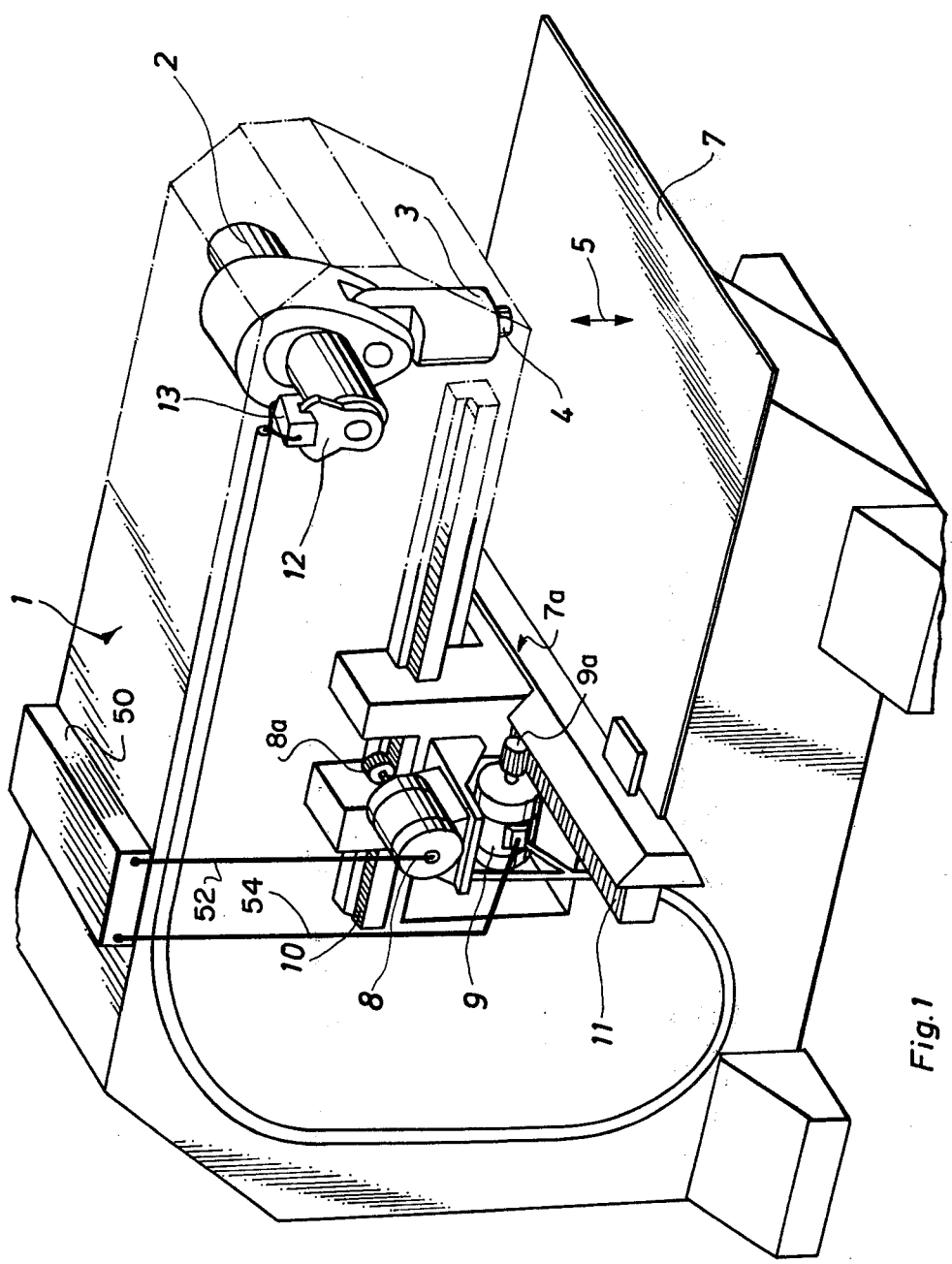
FIG. 1 is a front perspective diagrammatical view of a nibbling machine constructed in accordance with the invention.
Figure 2:
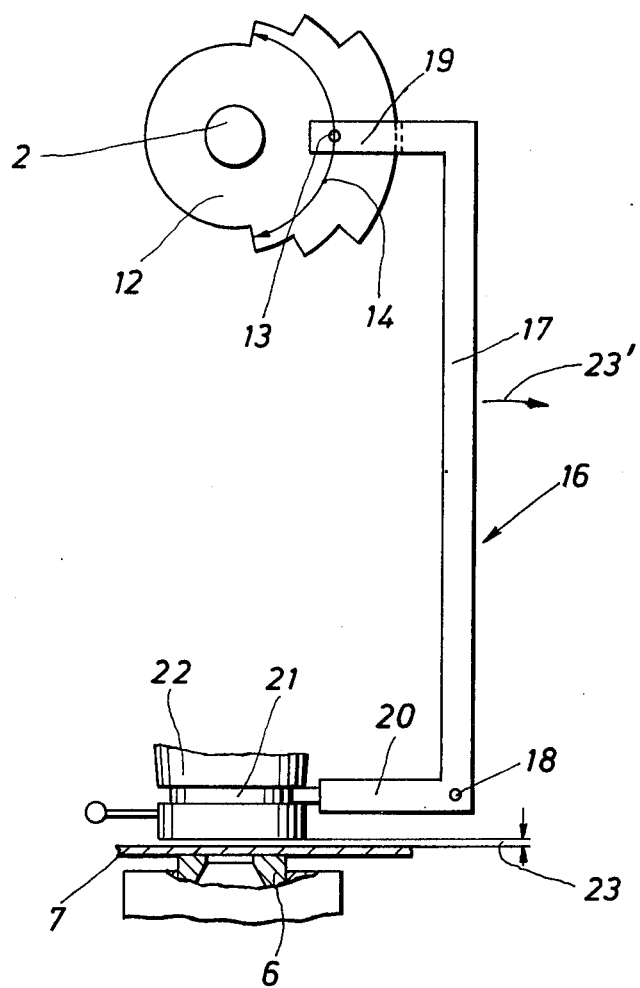
FIG. 2 is an enlarged schematic view of the apparatus for sensing the thickness of the workpiece for controlling the feed thereof in the device shown in FIG. 1.

Referring to the drawings in particular, the invention embodied therein as shown in FIGS. 1 and 2, comprises a nibbling machine, generally designated 1, which includes an eccentric shaft 2 for driving a ram 3 in which a nibbling punch 4 is received. The punch 4 cooperates with a die 6, as shown in FIG. 2, and the upward and downward movement of the ram 3 with the punch 4, as indicated by the double arrow 5, effects a nibbling of the workpiece 7. Workpiece 7 which is to be nibbled comprises a metal plate and it is mounted on a workpiece holder, generally designated 7a, which moves the workpiece 7 in controlled transverse and longitudinal directions. The longitudinal motion is effected by a feed motor 8 which drives a pinion 8a to move a rack 10 so as to displace the workpiece holder 7a in the longitudinal direction. A second feed motor 9 drives a pinion 9a to move it in respect to a rack 11 to effect a transverse movement of the workpiece holder 7a and the workpiece 7. The workpiece 7 can thus be displaced in the workpiece plane in any direction, with the feed motors 8 and 9 being adapted to be switched on and off individually or simultaneously.

Since a displacement of the workpiece 7 is possible only as long as the punch 4 is completely disengaged from the workpiece, and assuming a constant stroke of the punch, the distance through which the punch can travel outside the workpiece is smaller in accordance with the greater thickness of the workpiece sheet. Consequently, the period of time during which the two feed motors can be switched on is shorter for thicker workpieces than for thinner ones. Therefore, considering a constant feeding speed, a relatively shorter feed path is available for thicker plates than for thinner sheets. On the other hand, with a punch of given design and assuming the same cutting performance, larger segments can be punched off a thinner sheet than from a thicker one.

The invention provides a means for varying the feed movement of the workpiece 7 as a function of the thickness of the workpiece so that the nibbling machine can be utilized to its optimum.

In the embodiment of FIGS. 1 and 2, the invention comprises a switch control member which is designed as a rotatable lug 12 which is affixed to the eccentric shaft 2 for rotation therewith. In accordance with a feature of the invention, control lug 12 cooperates with a contactless switch 13 which is adjustably positioned in respect to the control lug and which provides an electrical control connection for the respective motors 8 and 9. The shape of control lug 12 may vary as indicated in the various embodiments 2 to 5.

Switch 13 is placed in the circuit of the two feed motors 8 and 9, and the motors can run only as long as switch 13 is on. Motors 8 and 9 are also controlled by a control programmer 50 which is indicated as being connected through electrical connections 52 and 54 to the respective motors 8 and 9. The programmer 50 not only determines which of the motors 8 and 9 is to be switched on but also the direction of rotation of the motors. As soon as the switch lug 12 has reached the switch element of switch 13, the contacts of the switch are closed. They reopen again only after the switch lug has completely passed the switch element. For a given angular speed of switch lug 12, the period of time during which switch 13 is switched on depends on the effective length of lug 12 in the circumferential direction, that is, the arcuate control switching area which is associated with the switch 13.

In the embodiment of FIG. 2, the portion of switch lug 12 which is usable for switching purposes has the shape of three separate circular ring sections adjoining each other in the radial direction. In the circumferential direction, the lengths of these sections are approximately equal to each other. However, the switch angle or effective circumferential switch influencing area of the outer section is smaller than the switch angle of the two inner sections due to the different distances from the eccentric shaft 2. If the switch 13 is associated, for example, with the innermost section of switch lug 12, the greater switch angle 14 results in a longer closed circuit period as shown in FIG. 2 than in the case of the smaller switch angle 15 for contact surface engagement which is effected in the arrangement of FIG. 3.

Figure 3:
FIG. 3 is a view similar to FIG. 2 showing a thicker workpiece.
Figure 4:
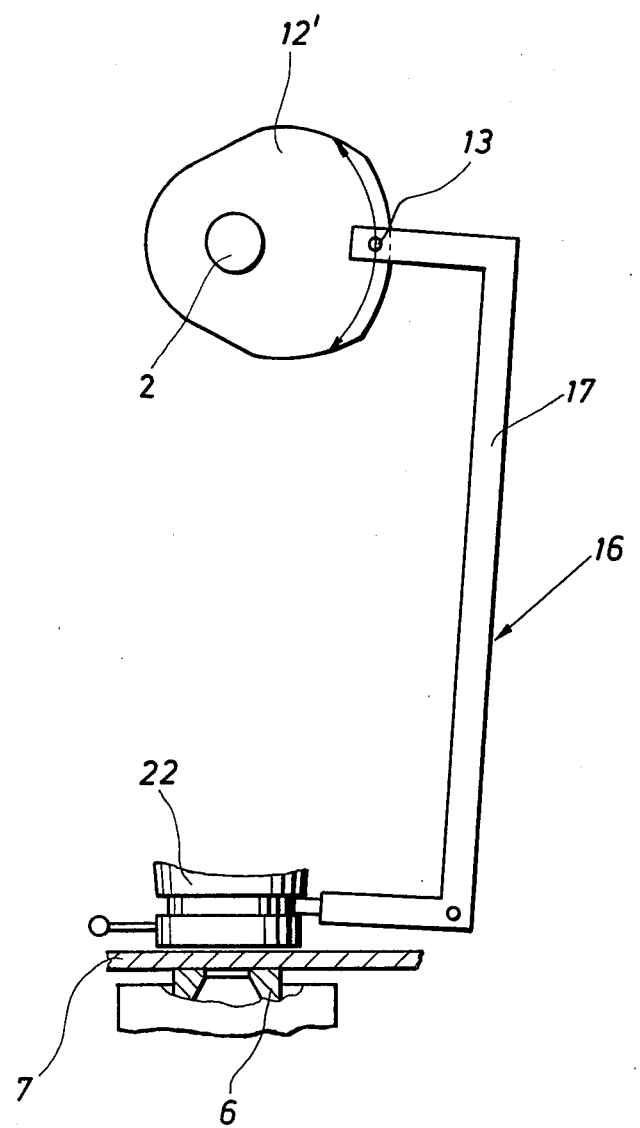

The invention provides adjustment means 16 which effects a change in the control of the operation of the motors and the resultant feed of the workpiece, in accordance with the workpiece thickness automatically. In the embodiments of FIGS. 1 to 3, the adjustment mechanism includes a switch 13 which is mounted so that it may be displaced relative to the switch lug or control member 12. In the embodiments of FIGS. 2 to 4, the adjustment mechanism comprises a U-shape swing lever 17 having a pivoted or swing axis 18. The switch 13 is secured to a first leg portion 19 and a second leg portion 20 is engaged on a downholder 22 which is positioned over the workpiece 7. The leg portion 20 engages in a groove 21 of the downholder 22 and the downholder is spaced from the workpiece by a distance 23. This distance 23 is approximately the same for all thicknesses of sheets or plates. Therefore, with a thicker plate to be worked on, the downholder has to be lifted and this automatically results in a swinging of the swing lever 17 in the direction of the arrow 23' and, consequently, it results in displacement of switch 13 radially outwardly in respect to the associated control lug 12. By this movement, the switch-on time is automatically adjusted and the thickness of the workpiece 7 is taken into account.

FIGS. 4 and 5 show arrangements wherein the control lugs 12 and 12' are provided with a continuous surface outline rather than a discontinuous outline as shown in FIGS. 2 and 3. The variations of the metal workpiece thicknesses can be taken into account continuously. The degree to which the variations of the metal sheet thickness effect a reduction or extension of the closed circuit period of time depends on the shape of the outline of the switch lug 12' or 12''.

In the embodiment of FIG. 5, a clamping mechanism, generally designated 23, is used for fixing the workpiece 7. The clamping mechanism includes a clamping shoe 24 which is supported by a movable part of the coordinate positioning equipment. Shoe 24 is tightened or relieved by means of a pivotal control handle 25. Therefore, the angular position of control handle 25 is a measure of the thickness of workpiece 7. If control handle 25 is connected to the pickoff of a rotary potentiometer 26, each angular position, and thus, each metal sheet thickness results in a definite electrical signal which is transmitted through lines 27 to a servometer 28. The servometer drives a screw spindle 29 to displace a holder 30 for a control switch 13 which may be displaced in the direction of the double arrow 31. Switch 13 is moved toward or away from the axis of rotation of the switch control lug 12'' in a manner similar to the other embodiments and switch 13 becomes associated with different switch angles of switch lug 12.

In the embodiment of FIG. 6, a control lug 12''' is shown in association with a starter switch mechanism 31 and a disconnecting switch mechanism 32. Lug 12''' rotates in a direction relative to the associated switches as indicated by the arrow 33. Starter switch 31 is disconnecting switch 32 are adjustably mounted on a holder 35 and are displaceable relative to each other in the directions indicated by the double arrows 34. This makes it possible to extend or reduce the period of time during which feed motors 8 and 9 are switched on by varying the angular spacing between the switches 31 and 32. The displacement of swiches 31 and 32 may be effected by means of an adjusting mechanism, similar to the mechanism 16 which operates in accordance with the thickness of the worked metal sheet or workpiece and the mechanism for accomplishing this may be the same as that shown in FIGS. 1 to 4. The adjusting mechanism must be varied, however, to displace the switches along the circular periphery of the holder 35. The switches 31 and 32 may be secured to a holder which is similar to the holder 30 of FIG. 5 and moved in a similar manner if desired. In the latter case, a mobile coupling of the holder or holders 30 to the switches 31 and 32 is to be applied in the same manner. The adjusting mechanism shown in FIG. 5 comprises the electrical servomotor apparatus, designated by the reference numeral 36.

While specific embodiments of the invention have been shown and described in detail to illustrate the application of the principles of the invention, it will be understood that the invention may be embodied otherwise without departing from such principles.

We claim:
1. A device for shifting a workpiece on a nibbling machine having a rotary eccentric shaft which is rotatable to move a nibbling punch into and out of association with a workpiece, comprising a workpiece holder, first motor means connected to said workpiece holder for shifting the workpiece in a longitudinal direction, second motor means connected to said workpiece for shifting said workpiece holder with the workpiece in transverse directions, switch control means connected to said first and second motor means to activate and deactivate said motor means and including a sensor for sensing the thickness of the workpiece, a switch control member for controlling the activation and deactivation of said first and second motor means and an adjusting mechanism connected between said sensor and said switch control member for varying said switch control member and the duration of operation of said first and second motor means.

2. A device according to claim 1, including a downholder associated with the workpiece, said sensor being engaged with said downholder.

3. A device according to claim 1, wherein said sensor comprises a clamping device for the workpiece including a clamping shoe engageable on said workpiece providing a sensing position for the thickness of the workpiece, said adjusting mechanism being adjusted in accordance with the positioning of said clamping shoe.

4. A device according to claim 1, wherein said switch control member comprises a lug adapted to be connected to the eccentric shaft for rotation therewith, said lug having a surface defining two separate switch control arcs of different circumferential length, said switch control means including a switch of a type to be actuated by said switch control member, said ajusting mechanism comprising means for shifting the position of said switch in respect to said control member for varying the location of the arcuate control surface which is associated with said switch and thus varying the length of time of operation of said first and second motor means.

5. A device according to claim 1, wherein said adjusting mechanism comprises a double-arm lever, means pivotally mounting said lever, said lever having one arm comprising said sensor, a downholder positioned over the workpiece and engaged with said one arm, said lever having an opposite arm, said switch control means including a switch carried by said opposite arm and being movable relative to said switch control member for varying the time of activation of said first and second motor means.

6. A device for shifting a workpiece on a nibbling machine having a rotary eccentric shaft which is rotatable to move a nibbling punch into and out of association with a workpiece, a comprising a workpiece holder, first motor means connected to said workpiece holder for shifting said workpiece holder and the workpiece in longitudinal directions, second motor means connected to said workpiece holder for shifting said workpiece holder and the workpiece in transverse directions, a control cam member adapted to be connected to the shaft for rotation therewith and having a plurality of separate arcuate switch activation control areas, a contactless switch associated with said control member and being displaceable into association with a selected one of said control areas, said control areas being of distinct circumferential lengths so as to vary the length of time at which said switch is engaged, said switch being connected to said first and second motor means for actuating said motor means for a predetermined time as set by the engagement of said switch with the associated control areas of said control member, and means for sensing the position of the top of the workpiece on said workpiece holder as an indication of the thickness thereof and for adjusting the position of said switch in respect to said control member in accordance therewith.

7. A device according to claim 6, wherein said adjusting mechanism comprises a pivotal lever having one arm portion, a downholder engaged over the workpiece, said one arm portion being engaged with said downholder, said lever having an opposite arm portion connected to said switch for moving said switch in accordance with the positioning of the first arm portion on said downholder.

8. A device according to claim 7, wherein said adjusting mechanism lever comprises a U-shaped member having first and second spaced apart leg portions which an intermediate portion extending between said downholder and said control member.

9. A device according to claim 1, wherein said sensor comprises a clamp having a rotatable part engageable with the workpiece and determining the top of said workpiece, a servomotor connected to said rotatable part and including a potentiometer actuated by said rotatable part to move said servometer, and means connected between said servomotor and said switch for shifting said switch in accordance with the rotation of said servomotor.

10. A device according to claim 1, wherein said switch control means includes a starter switch and a disconnecting switch, means mounting said switch for movement toward and away from each other, said control member being movable through a path intersecting said starter switch and said disconnecting switch, said adjusting mechanism being connected to at least one of said starter and disconnecting switches for shifting them in respect to the other of said switches.

* * * * *